US012587107B2

(12) United States Patent
Lipp et al.

(10) Patent No.: US 12,587,107 B2
(45) Date of Patent: Mar. 24, 2026

(54) BUSBAR DEVICE AND METHOD FOR PRODUCING A BUSBAR DEVICE

(71) Applicant: MAGNA Powertrain GmbH & Co KG, Lannach (AT)

(72) Inventors: Birgit Lipp, Markt Hartmannsdorf (AT); Michael Wadsack, Enns (AT); Thomas Schnabel, Asten (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 319 days.

(21) Appl. No.: 18/213,909

(22) Filed: Jun. 26, 2023

(65) Prior Publication Data

US 2024/0007013 A1     Jan. 4, 2024

(30) Foreign Application Priority Data

Jul. 4, 2022     (DE) ..................... 10 2022 206 795.9

(51) Int. Cl.
*H02M 7/00*          (2006.01)
(52) U.S. Cl.
CPC .................................. *H02M 7/003* (2013.01)
(58) Field of Classification Search
CPC .... H02M 7/003; H02M 1/44; H01R 13/7193; H01R 43/16
USPC ........................................................ 363/144
See application file for complete search history.

(56) References Cited

U.S. PATENT DOCUMENTS

| | | | |
|---|---|---|---|
| 7,352,269 B2 | 4/2008 | Li et al. | |
| 11,849,537 B2 * | 12/2023 | Pardo Peris | ........... H03H 7/427 |
| 11,862,374 B2 * | 1/2024 | Herrmann | ............... H01F 17/06 |
| 2014/0003095 A1 * | 1/2014 | Thomas | ........... H02M 3/33571 |
| | | | 363/21.04 |
| 2014/0139299 A1 | 5/2014 | Miller | |
| 2020/0067298 A1 | 2/2020 | Lindenberger | |

FOREIGN PATENT DOCUMENTS

| | | |
|---|---|---|
| DE | 102018215801 A1 | 3/2020 |
| EP | 3619800 B1 | 10/2021 |
| WO | 2021115888 A1 | 8/2021 |

* cited by examiner

*Primary Examiner* — Thienvu V Tran
*Assistant Examiner* — Lauren Ashley Shaw
(74) *Attorney, Agent, or Firm* — Dickinson Wright PLLC

(57)          ABSTRACT

A power converter having a busbar device includes at least one ferrite core filter and at least two busbars, which are spaced from one another in an electrically insulated manner. The busbars may have different electric potentials, so that the busbars can carry an electric current appropriate for a bar cross-sectional area. The busbars are guided at least once through at least one feed-through opening of the ferrite core filter. The busbars are one piece in each case, and are reshaped by a bend formed in a passage area of the feed-through opening, and a passage cross-sectional area of the busbars in the passage area is at least the same size as the bar cross-sectional area, so that the busbars can carry the same electric current along the run of the busbars.

9 Claims, 2 Drawing Sheets

1

BUSBAR DEVICE AND METHOD FOR PRODUCING A BUSBAR DEVICE

CROSS-REFERENCE TO RELATED APPLICATIONS

Figure 1:
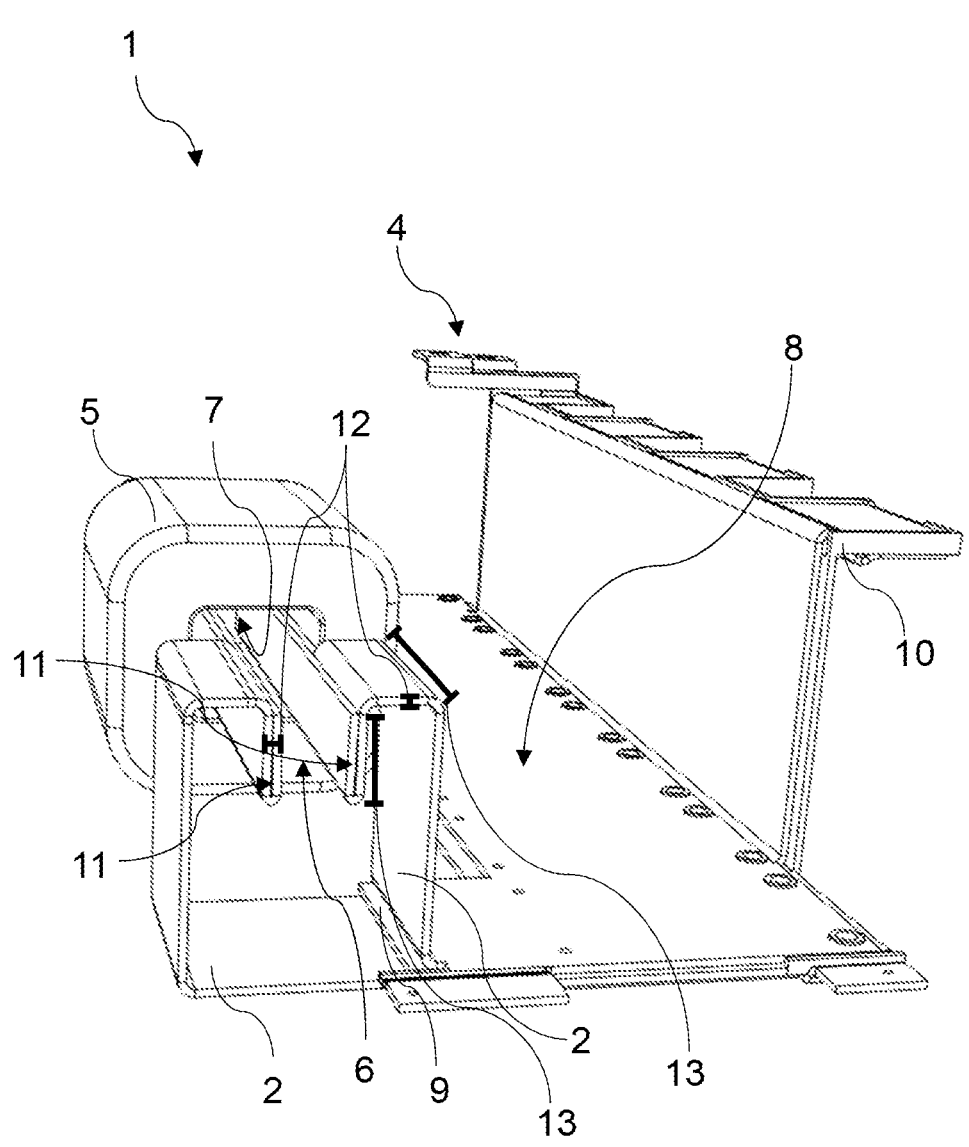

This application claims priority to German Application No. DE 10 2022 206 795.9 filed Jul. 4, 2022. The entire disclosure of the above application is incorporated herein by reference.

FIELD OF THE INVENTION

The invention relates to a power converter having a busbar device, a method for producing a busbar device and a busbar device for carrying and distributing electric currents, having at least one ferrite core filter and having at least two busbars, which are spaced from one another in an electrically insulated manner, it being possible for the busbars to have different electric potentials, so that the busbars can carry an electric current appropriate for a bar cross-sectional area, and the busbars being guided at least once through at least one feed-through opening of the ferrite core filter.

BACKGROUND OF THE INVENTION

Busbars are known from practice, using which in some instances high electric currents can be distributed. Accordingly, busbars are used in power converters to connect a capacitive DC link, which is equipped with capacitors, in an electrically conductive manner to a DC and AC side of the power converter. The busbar is structured in this case such that the busbar can conduct the currents of the DC side, which are applied to the power converter, to the AC side in as low-inductance and low-resistance a manner as possible. Insofar as the currents from the power converter are switched by semiconductor switches, in order to convert the currents to a desired frequency and voltage, electromagnetic interference is necessarily created, which must be filtered, so that the power converter cannot interfere with other connected and neighbouring electromagnetically sensitive devices.

Usually, the busbars known from practice have ferromagnetic ferrite core filters on the DC side, which must encompass all busbars together in order to fulfil the filtering function of the ferrite core filters.

A busbar with improved properties is known from the published document DE 10 2020 111 801 A1. The busbar comprises a first interface, a second interface and a first bar between the first interface and the second interface. The first bar comprises a central section with a metal plate and a dielectric material, which at least partially covers the central section.

An inverter is known from the published document EP 3 619 800 B1, having a first busbar for connection to a positive terminal of a battery and having a second busbar for connection to a negative terminal of the battery and having a filter for reducing common- and differential-mode interference, which filter comprises a toroidal core made from a ferromagnetic material, which surrounds the first and the second busbar. A core made from a further ferromagnetic material is provided in an intermediate space, which is surrounded by the toroidal core and formed between the two busbars, wherein the busbars have recesses which face one another and surround the core in sections. In this respect, the recesses are intended to mechanically hold and lock the additional core consisting of a ferromagnetic material, wherein the additional core is intended to improve a filtering action of the toroidal core.

Although busbars have different functions, the main task thereof is to carry and to distribute electric currents. It is therefore an object of the invention to provide a busbar having an improved current carrying capacity, without having structural impairments.

SUMMARY OF THE INVENTION

This section provides a general summary of the disclosure, and is not a comprehensive disclosure of its full scope or all of its features The object is achieved according to the invention according to Patent claim 7, wherein according to a method for producing a busbar device for carrying and distributing electric currents, having at least one ferrite core filter and having at least two busbars, which are spaced from one another in an electrically insulated manner, the one-piece busbars being reshaped in a first step by bend forming, and the busbars being guided through a passage area of a feed-through opening of the ferrite core filter in a following step, so that a passage cross-sectional area of the busbars in the passage area corresponds to a bar cross-sectional area of the busbars outside the passage area.

The object is also achieved according to the invention with a busbar device according to claim 1, which is characterized in that the busbars are one piece in each case, wherein the busbars are reshaped by bend forming in a passage area of the feed-through opening and wherein a passage cross-sectional area of the busbars in the passage area is at least just the same size as the bar cross-sectional area, so that the busbars can carry the same electric current along the run of the busbars.

One-piece busbars have the advantage that the busbar can cost-effectively be stamped from one metal sheet in each case. In which case the stamped busbar can also be given an appropriate shape by bend forming for example, prior to the use of the stamped busbar. Although there are variously sized ferrite core filters to buy and these are usually also additionally purchased, it is structurally advantageous if the ferrite core filters are as small as possible. In this respect, the feed-through opening of the ferrite core filters is delimited, and so the stamped busbar has a reduced passage cross-sectional area in the passage area, so that the busbar can be guided through the feed-through opening. It is disadvantageous in this case that as a result the busbar also only has a reduced current carrying capacity in the passage area and the currents which can be conducted by the busbar are limited by the passage cross-sectional area in particular, which is usually disadvantageously accepted.

According to the invention, the busbars are reshaped and folded in the passage area by bend forming, as a result of which the passage cross-sectional area of the busbars can be increased by the folding. By advantageous folding, the passage cross-sectional area can be increased to the size of the remaining bar cross-sectional area outside of the passage area, so that the busbar as a whole has no current-carrying bottlenecks. According to the invention, it is therefore advantageous that the busbars in the passage area of the ferrite core filter are not excessively heated by the currents flowing in this section, without having to use a correspondingly larger ferrite core filter.

The use of the invention may have a particularly advantageous effect if it is provided according to an embodiment of the busbar device that the ferrite core filter is designed in one piece and is closed along a circumferential line around the at least two busbars. Optionally, it may also be provided according to the invention that the at least two busbars are enclosed along the passage area by the at least one ferrite core filter. Often, multi-piece—usually two-piece—ferrite core filters are used in practice. However, these have a poorer filtering action, as the parts of the multi-piece ferrite core filters are necessarily spaced by at least one air gap. By contrast, it is more advantageous to design the ferrite core filter to be closed, wherein the busbars can be adapted according to the invention by bend forming in such a manner that the busbars can easily be guided through the feed-through opening of the ferrite core filter.

According to an advantageous and low-inductance embodiment of the invention, it may be provided that the busbars are arranged running parallel to one another at least in sections. A parallel run with a spacing of the busbars which is as small as possible is technically advantageous, since as a result an area which the busbars span together can be kept small, as a result of which a parasitic inductance of the busbar device can likewise be reduced.

In order to achieve an improved electrically insulated spacing, it may be provided according to an embodiment of the invention that the at least two busbars are electrically insulated by means of an element consisting of a plastic material and arranged spaced from one another. Optionally, it may likewise advantageously be provided that the at least two busbars are sheathed by a plastic material after the first step of bend forming, before the busbars are guided through the feed-through opening of the ferrite core filter in the following step. A smallest possible spacing of the busbars from one another is technically advantageous. By contrast, the busbars can have an electric potential and an electric voltage can arise between the busbars. In order to avoid an electrical breakdown and a short circuit, an insulation element made from a dielectric material can be arranged between the busbars. A plastic film, sheathing of the busbars with plastic or a plastic element is particularly suited to this, as plastic acts in an electrically insulating manner and can be both easily applied to the busbars and arranged between the busbars.

In order to reduce the space requirement inside the passage area further, it may be provided according to an advantageous embodiment of the invention that the busbars in the passage area are reshaped by at least 90° by bend forming, wherein the reshaped busbars run in a v- or u-shaped manner at least along the passage area. Optionally, it may also advantageously be provided that the at least two busbars are in each case reshaped along the passage area in a v- or u-shaped manner by bend forming. In the case of the one-piece busbar, it is appropriate to bend form the busbar in a v- to u-shaped manner, so that a section of the busbar guided through the passage area can be given a compact shape and therefore can be guided through the feed-through opening more easily. Furthermore, folding of the busbars in the passage area is advantageous, since as a result the current-carrying passage cross-sectional area does not have to be reduced compared to the remaining busbar cross-sectional area—stamping of the busbar into shape necessarily leads by contrast to a reduction of the passage cross-sectional area and therefore, in the case of current flow, to heating of the busbar in the passage area.

The invention also comprises a power converter 100 having at least one semiconductor switch 102 and at least one capacitive or inductive DC link device 104, wherein the semiconductor switch 102 and the DC link device 104 are electrically conductively connected to an electrical energy supply device 106, and wherein the energy supply device 106 is electrically conductively connected to the DC link device 104 by means of a busbar device 1 according to the invention.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
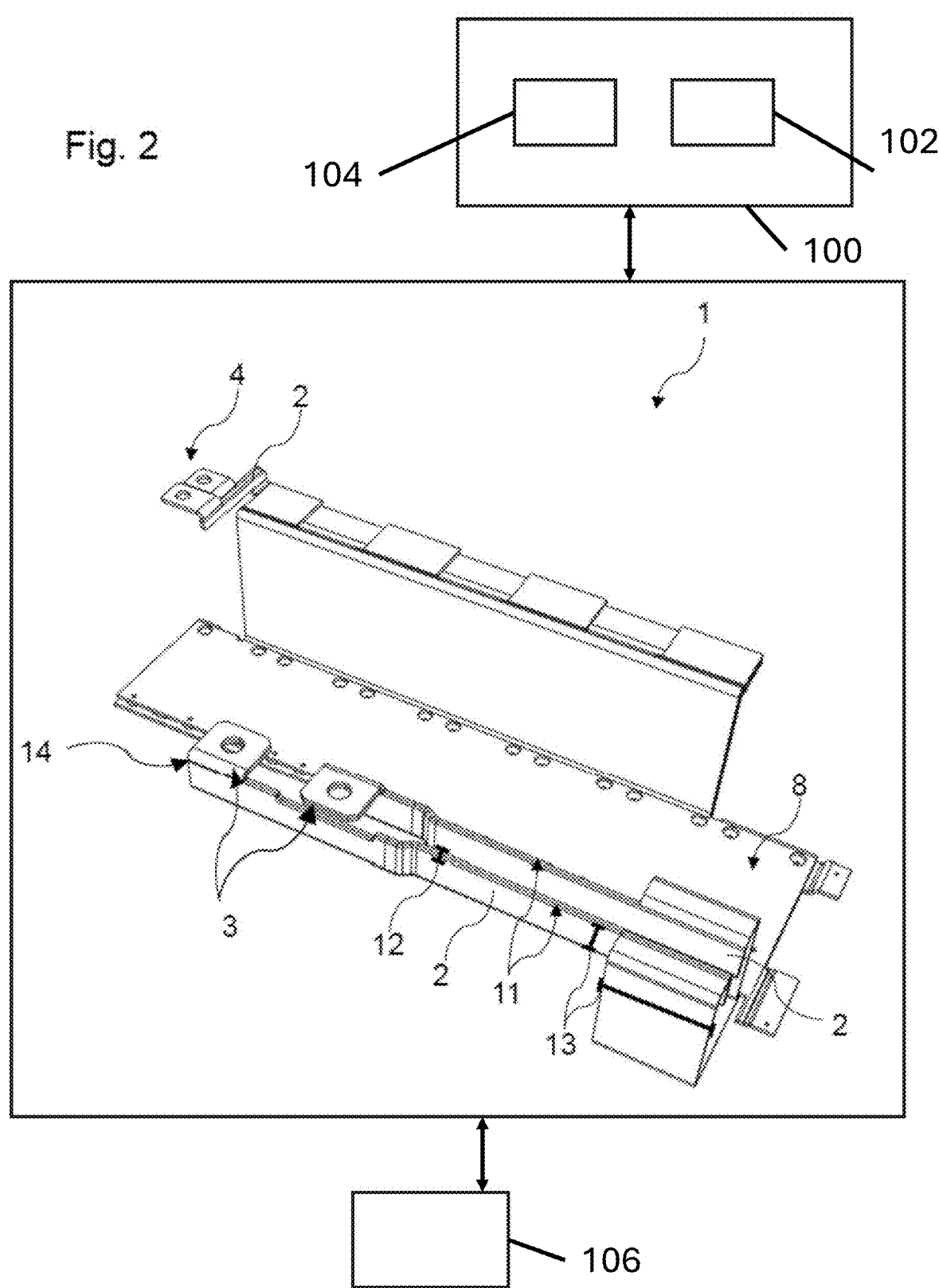

FIG. 1 shows a busbar device having two busbars and a closed ferrite core filter in a perspective illustration, and FIG. 2 shows only the two busbars without the ferrite core filter in a different perspective illustration.

DETAILED DESCRIPTION OF THE INVENTION

FIG. 1 and FIG. 2 show the busbar device 1 according to the invention having the two busbars 2, wherein the busbars 2 can be electrically conductively connected at two DC terminal contact points 3 to an electrical energy supply device and at two AC terminal contact points 4 to electric semiconductor switches. In an active operating state, the busbar device 1 can carry electric currents from the energy supply device to the semiconductor switches and also vice versa.

Close to the DC terminal contact points 3, the busbars 2 are enclosed by the ferromagnetic ferrite core filter 5, wherein the ferrite core filter 5 can attenuate and therefore filter rectified high-frequency interference currents flowing through the busbars 2. In order to be able to deploy the common-mode-interference-filtering action of the ferrite core filter, the ferrite core filter 5 must therefore enclose both busbars 2 at the same time. To this end, the ferrite core filter 5 has a feed-through opening 7 in a passage area 6, through which the two busbars 2 can be guided.

The busbars 2 have a DC link connection region 8, in which DC link capacitors can be electrically conductively connected to the busbars 2. In order that the busbar device 1 has a smallest possible parasitic inductance and the DC link capacitors can be electrically conductively connected to semiconductor switches in as low inductance a manner as possible via the busbars 2 and the AC terminal contact points 4, the busbars 2 are guided parallel and spaced from one another as little as possible in the DC link connection region 8. In order to keep the spacing of the busbars 2 from one another as small as possible, the busbars 2 are spaced from one another in an electrically insulated manner using a plastic film 9 and a plastic element 10.

In order to achieve as constant as possible a current carrying capacity of the busbars 2 along the busbars 2, the busbars 2 in each case have a v- or u-shaped bend-formed fold 11 in the passage area 6 and in the feed-through opening 7, using which a passage cross-sectional area of the busbars 2 is doubled and at least the same size as a bar cross-sectional area outside of the passage area 6, wherein both cross-sectional areas are determined by a bar thickness 12 and a bar width 13. The bend-formed fold 11 of the busbars 2 means that the busbars 2 can be guided through the rectangular feed-through opening 7 with an increased passage cross-sectional area. As a result, according to the invention, a current carrying capacity of the busbars 2 in the passage area 6 and the feed-through opening 7 can thereby be increased to the same level as outside of the passage area 6.

In a DC voltage connection region 14 of the busbar device 1, the busbars 2 are additionally open in a u- or v-shaped manner towards the DC terminal contact points 3, so that even the DC terminal contact points 3 can be shaped and reshaped directly from the busbars 2 by bend forming. First, this is advantageous in terms of production engineering and second, according to this embodiment, the DC terminal contact points 3 have the same bar cross-sectional area as the remaining sections of the busbars 2.

What is claimed is:

1. A busbar device for carrying and distributing electric currents, the busbar device comprising:

at least one ferrite core filter and at least two busbars, which are spaced from one another in an electrically insulated manner, wherein the busbars have the same or different electric potentials, so that the busbars can carry an electric current appropriate for a bar cross-sectional area, and wherein the busbars are guided at least once through at least one feed-through opening of the ferrite core filter, wherein the busbars are one piece in each case, wherein the busbars are reshaped via bend forming in a passage area of the feed-through opening, and wherein a passage cross-sectional area of the busbars in the passage area is at least just the same size as the bar cross-sectional area, so that the busbars can carry the same electric current along the run of the busbars;

wherein the busbars in the passage area are reshaped by at least 90° via bend forming, wherein the reshaped busbars run in a v-or u-shaped manner at least along the passage area.

2. The busbar device according to claim 1, wherein the ferrite core filter is designed in one piece and is closed along a circumferential line around the at least two bus-bars.

3. The busbar device according to claim 1, wherein the busbars are arranged running parallel to one another at least in sections.

4. The busbar device according to claim 1, wherein the at least two busbars are electrically insulated by means of an element consisting of a plastic material and arranged spaced from one another.

5. The busbar device according to claim 1, wherein the busbars outside of the passage area are reshaped by at least 90° by bend forming in a DC voltage connection region of the busbar device, wherein the reshaped busbar run in a v-or u-shaped manner in the DC voltage connection region and also are open in a v- or u-shaped manner in the direction of at least two DC terminal contact points.

6. A power converter having at least one semiconductor switch and at least one capacitive or inductive DC link device, wherein the semiconductor switch and the DC link device are electrically conductively connected to an electrical energy supply device, wherein the energy supply device is electrically conductively connected to the DC link device by means of a busbar device according to claim 1.

7. A method for producing a busbar device for carrying and distributing electric currents, the busbar device having at least one ferrite core filter and having at least two busbars, wherein the at least two busbars are each one-piece busbars, which are spaced from one another in an electrically insulated manner, wherein the busbars have the same or different electric potentials, so that the busbars can carry an electric current appropriate for a bar cross-sectional area, the method comprising:

bend forming and re-shaping the one-piece busbars in a first step, and guiding the busbars through a passage area of a feed-through opening of the ferrite core filter in a following step, so that a passage cross-sectional area of the busbars in the passage area is at least just the same size as the bar cross-sectional area of the busbars outside the passage area, so that the busbars can carry the same electric current along the run of the busbars;

wherein the at least two busbars are in each case reshaped by at least 90 degrees along the passage area of the feed-through opening in a v-or u-shaped manner via bend forming.

8. The method according to claim 7, wherein the at least two busbars are enclosed along the passage area by the at least one ferrite core filter.

9. The method according to claim 7, wherein the at least two busbars are sheathed by a plastic material after the first step of bend forming, before the busbars are guided through the feed-through opening of the ferrite core filter in the following step.

* * * * *